United States Patent
Kamman

(10) Patent No.: US 11,346,522 B2
(45) Date of Patent: May 31, 2022

(54) AUTOMOBILE RETRACTABLE HIDDEN BACK-UP LAMP

(71) Applicant: Kenneth Kamman, Bloomfield, MI (US)

(72) Inventor: Kenneth Kamman, Bloomfield, MI (US)

( * ) Notice: Subject to any disclaimer, the term of this patent is extended or adjusted under 35 U.S.C. 154(b) by 226 days.

(21) Appl. No.: 16/830,521

(22) Filed: Mar. 26, 2020

(65) Prior Publication Data

US 2021/0302001 A1 Sep. 30, 2021

(51) Int. Cl.
*F21S 43/27* (2018.01)
*F21V 23/04* (2006.01)
*F21V 23/00* (2015.01)
*F21W 103/45* (2018.01)

(52) U.S. Cl.
CPC ............ *F21S 43/27* (2018.01); *F21V 23/008* (2013.01); *F21V 23/04* (2013.01); *F21W 2103/45* (2018.01)

(58) Field of Classification Search
CPC ........ F21S 43/27; F21V 23/008; F21V 23/04; F21W 2103/45
See application file for complete search history.

(56) References Cited

U.S. PATENT DOCUMENTS

2003/0063475 A1* 4/2003 Simmons ................. B60Q 1/24
362/526
2004/0100803 A1* 5/2004 Steward ................... B60Q 1/05
362/523

\* cited by examiner

*Primary Examiner* — Anne M Hines

(57) ABSTRACT

A rear hidden lighting system for an automobile is comprised of a lamp mounted to a bracket attached to the vehicle's rear structure, a linear actuator mounted to the vehicle's structure which rotates the lamp, an electronic relay system which powers the linear actuator in two directions, a switch mounted to the transmission of the vehicle which provides switched power to the linear actuator. When the vehicle is placed in reverse gear, the lamp will rotate out of a hidden position becoming visible and lighting the rear of the vehicle. The lamp will rotate back to the hidden position when the vehicle is taken out of reverse gear. An objective and benefit is that the lamp and bracket and the linear actuator can be mounted to existing attachment points on the vehicle which will not necessitate drilling holes, altering vehicle componentry or welding parts to existing vehicle parts or structure.

12 Claims, 4 Drawing Sheets

REAR VIEW OF SYSTEM

TOP VIEW OF SYSTEM

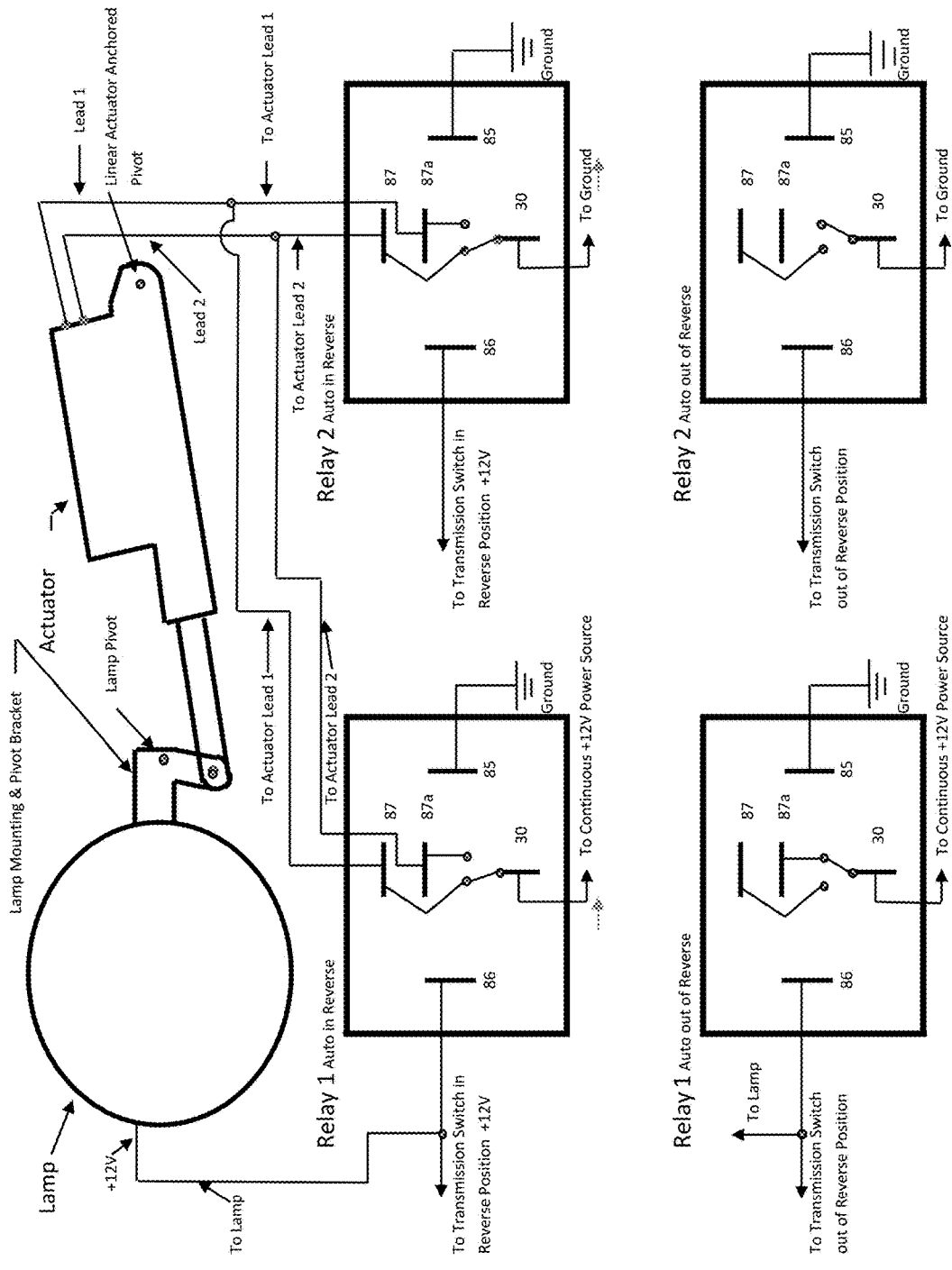

AUTOMOBILE RETRACTABLE HIDDEN BACK-UP LAMP

BACKGROUND OF THE INVENTION

1. Field of the Invention

The present invention relates to an electrical lamp for a motor vehicle which illuminates the rear of the vehicle. More specifically, this invention relates to an illuminating electrical lamp which is hidden from view in the off unlit mode and becomes lit and in view when the vehicle is engaged in reverse gear. Although this invention can be utilized for many motor vehicles, the application of this invention is intended for vintage and antique motor vehicles.

2. Prior Back Ground Summary

The first back-up lighting systems for motor vehicles appeared in the early 1920's and were standardized by the SAE in 1947. The US Federal Government made motor vehicle back-up lighting mandatory in the late 1960's. There are tens of thousands of vintage motor vehicles registered today which do not have a back-up lighting system. Owners of these vehicles are mostly automotive enthusiasts and collectors of which many enjoy using and driving these vintage vehicles. Back-up illumination of the rear of a motor vehicle allows for a safer backing up process. To install fixed immobile back-up lighting on a vehicle would require modifications to the vehicle body and/or structure which defaces and compromises the authenticity of the vehicle. This invention allows for a retractable hidden back-up lighting system to be incorporated on a vintage motor vehicle without any defacement due to the ability to attach the lamp and bracketry components and the linear actuator to existing holes and/or mounting areas. Maintaining visual authenticity is accomplished by the fact that when the vehicle is not engaged in reverse gear, the lamp is rotated to a hidden, out of view position.

DETAILED DESCRIPTION OF THE PREFERRED EMBODIMENTS

Referring to FIG. 1, the Retractable Hidden Automobile Back-Up Lamp invention is shown with all of the vehicle embodiments involved. Shown in the FIG. 1. diagram is a power source 1 which supplies 6 volts DC or 12 volts DC power 2 to a Reverse Gear Switch 3 mounted on the vehicle's transmission. The Reverse Gear Switch 3 is closed when the vehicle is shifted into reverse gear which connects power 4 to the Integrated Relays 5 and power 6 to a Lamp 14. The Integrated Relays 5 are attached to Support Structure 8. The attachment method can simply be tie strapping to a vehicle cross member, vehicle frame, the Actuator 10 or any other convenient location. The Integrated Relays 5 also receive a continuous power source 7 from the plus side of the Reverse Gear Switch 3 allowing the Relays to maintain the Lamp 14 in the hidden off position. When the Reverse Gear Switch 3 is closed, the Reverse Gear Switch 3 provides power 6 to the Lamp 14 and allows the Integrated Relays 5 to power 9 the Actuator 10 rotating the Lamp 14 in the visible position. The Actuator 10 is attached to Support Structure 11 which can be the vehicle rear cross member, the rear body panel or another rigid vehicle structure. The Lamp 14 is also attached to a Support Structure 15 which can be the vehicle cross member, rear body panel or another rigid vehicle Support Structure.

Referring to FIG. 2, shown is the rear view of the operating geometry of the invention. The Lamp pivots about a fixed point rigidly attached to vehicle Support Structure. The Actuator is also attached to vehicle Support Structure and pivots on it's attachment. The retracting end of the Actuator is attached to the Lamp and rotates the Lamp about the Lamp's pivot point. The Actuator and Lamp are mounted above the vehicle's rear cross member, rear body panel or another object allowing the Actuator and Lamp to be hidden and not visible. When the vehicle is in reverse gear, the Lamp rotates downward in a visible position in order to illuminate the rear of the vehicle.

Referring to FIG. 3, shown is the top view of the Lamp and Actuator.

Referring to FIG. 4, shown is a schematic of the electronic operation of the invention. The Lamp and Actuator are both depicted in a rear view position with the Lamp rotated upward and unlit. Relay 1 and 2 are both shown together with the vehicle in reverse gear and below, Relay and 2 are both shown with the vehicle out of reverse gear. When the vehicle is shifted into reverse gear, the reverse gear switch mounted on the transmission is closed providing power to the Lamp for illumination and also providing power to the energizing terminals 86 on Relay 1 and 2. Input terminal 30 on Relay 1 is connected to a continuous power source which transfers power through output terminal 87 to the Actuator pulling on the Lamp which causes rotation downward allowing the Lamp to become visible illuminating the rear of the vehicle. Input terminal 30 on Relay 2 is connected to ground and transfers grounding through terminal 87 to the Actuator completing the circuit. Relay 1 and 2 at the lower portion of the schematic are shown with the vehicle reverse gear switch mounted on the transmission in open position with the vehicle out of reverse gear. In this case, there is no power input to terminal 86 on either Relay 1 and 2. Relay 1 transfers power through default terminal 87a which powers the Actuator to push and rotate the Lamp in the upward hidden position. Relay 2 transfers grounding through default output terminal 87a to the Actuator completing the circuit. Also, when the vehicle is out of reverse gear the reverse gear switch on the transmission is open and cuts power to the Lamp. Both Relay 1 and 2 are grounded through terminal 85.

BRIEF DESCRIPTION OF THE DRAWINGS

Presently preferred embodiments of the invention are disclosed in the following description and in the accompanying drawings, wherein:

FIG. 4. is a schematic of the electronics necessary to allow the invention to function.

SUMMARY OF THE INVENTION

Figure 1:
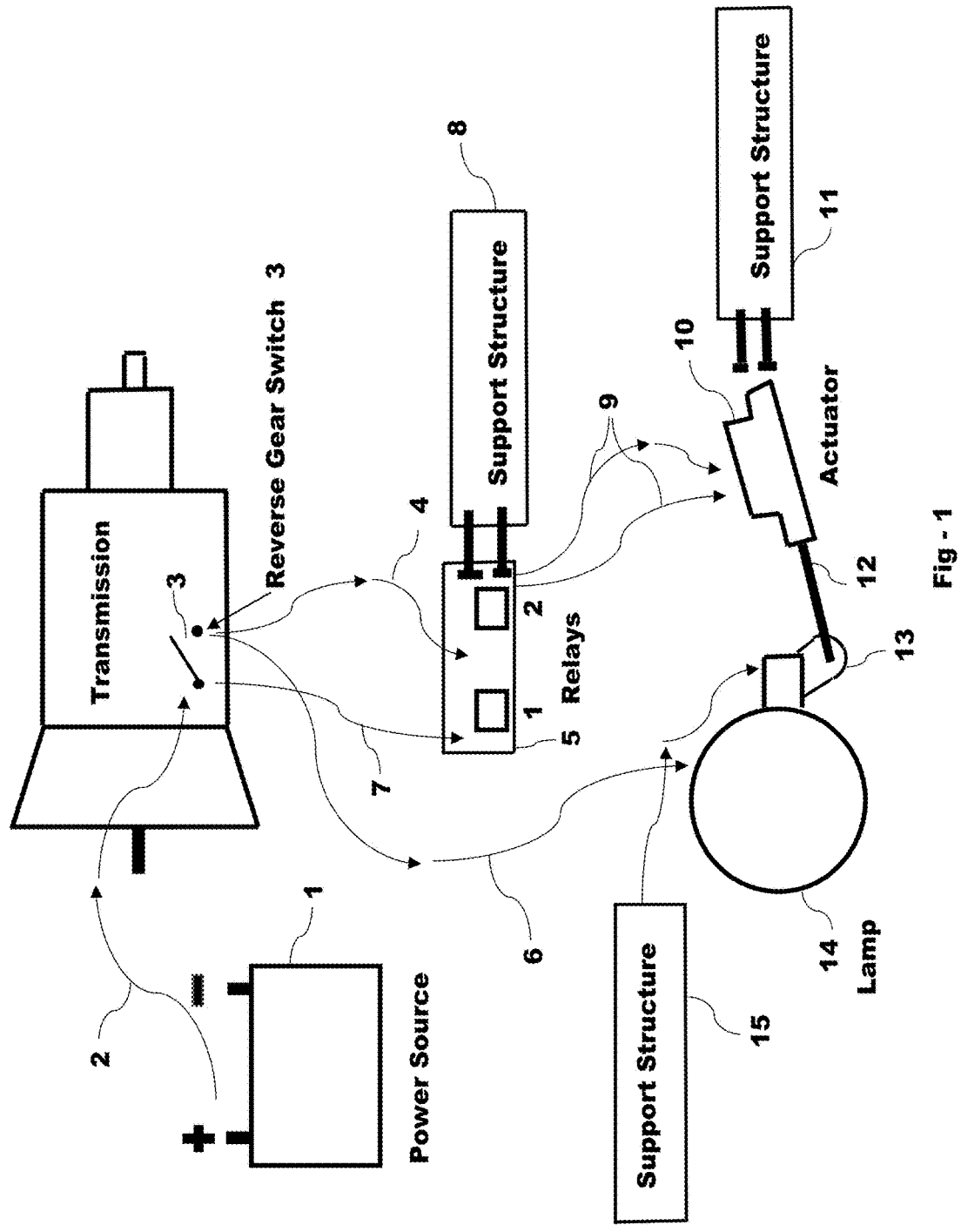
FIG. 1. is a schematic diagram of all of the vehicle embodiments involved in the invention.
Figure 2:
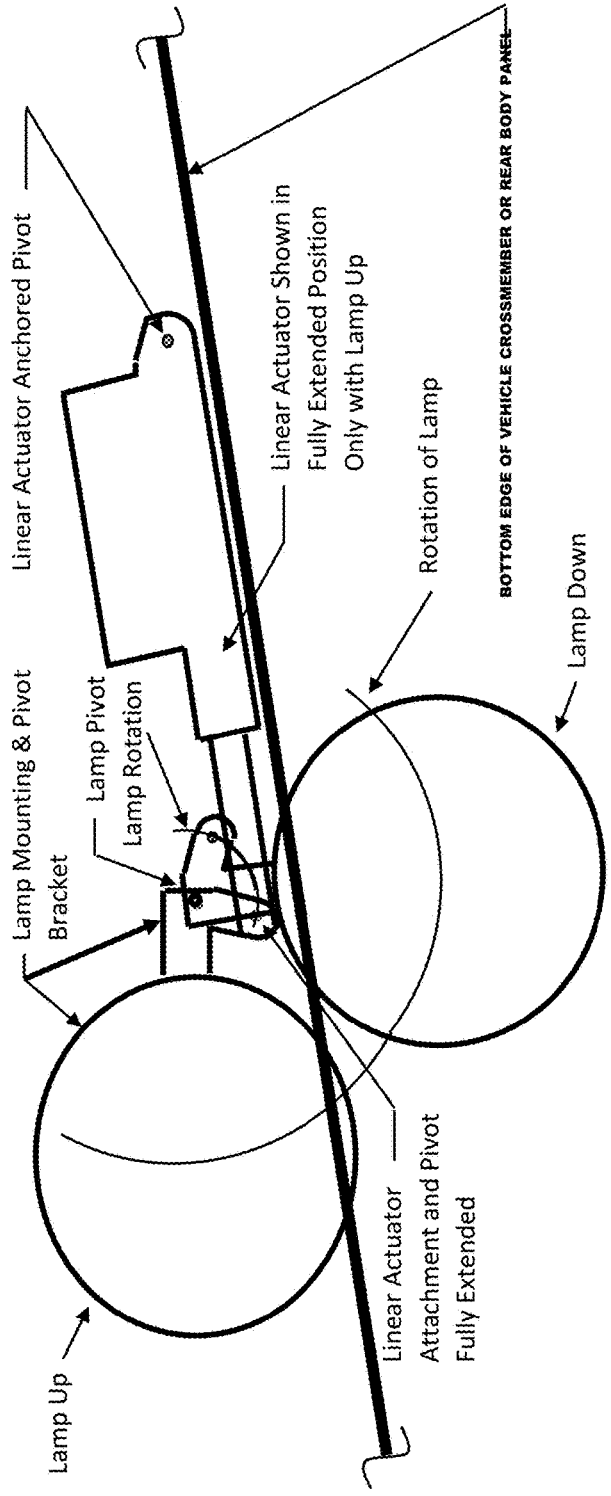
FIG. 2. is a rear view schematic of the mechanical component operation of geometry of the invention.
Figure 3:
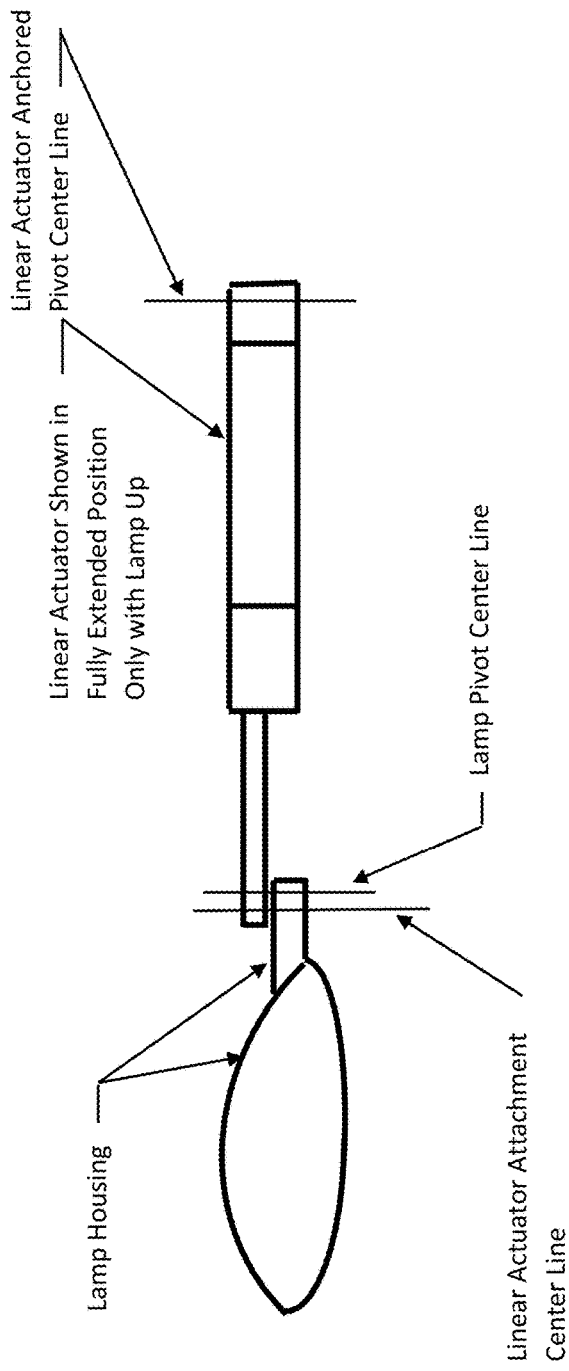
FIG. 3. is a top view schematic of the mechanical components involved in the operation of the invention.

According to the present invention, a retractable hidden backup lamp system for a motor vehicle which is primarily intended for vintage and antique motor vehicles. The motor vehicle having a support structure comprises a lamp which rotates, a linear actuator, an electronic relay system, a switch mounted on the transmission and a power source. The retractable hidden back-up lamp system further comprises a bracket mounted on vehicle structure which is attached to the lamp and allows rotation of the lamp and a linear actuator also mounted on the vehicle structure which is attached to the lamp causing, rotation of the lamp.

The invention claimed is:

1. A hidden retractable back-up lamp system for a vehicle having a component support structure and a vehicle transmission, the system comprising:
   a. a lamp having a power supply wire, a ground wire and a lamp housing where the lamp pivots on a bracket which is attached to the vehicle structure,
   b. a linear actuator attached to the lamp which allows rotation of the lamp about a fixed pivot point,
   c. the linear actuator attached to the vehicle structure,
   d. the linear actuator capable of pivoting on a bracket mounted to the vehicle structure,
   e. the linear actuator having two power input wires one wire for one direction of movement and the other wire for the opposite direction of movement,
   f. an electronic relay system to control two way movement of the linear actuator,
   g. a switch mounted to the vehicle transmission to provide power to the lamp and the electronic relay system,
   h. a continuous power source to the switch,
   i. a continuous power source to the relay system to allow the linear actuator to retract the lamp to the hidden position when the vehicle is dis-engaged from a reverse gear,
   j. a DC invertor from 6 volts to 12 volts for vehicles having a 6 volt power system,
   k. a ground wire to the relay system,
   l. a ground wire to the lamp,
   m. a lamp perpendicular to the linear actuator when in the lit and visible state and in-line to the linear actuator when in the unlit hidden retracted state.

2. The hidden retractable back-lamp of claim 1 wherein the lamp is unlit when the vehicle is dis-engaged from reverse gear.

3. The hidden retractable back-lamp of claim 1 wherein the lamp which is hidden from view when the vehicle is dis-engaged from reverse gear.

4. The hidden retractable back-lamp of claim 1 wherein the lamp is visible when the vehicle is engaged in reverse gear.

5. The hidden retractable back-lamp of claim 1 wherein the lamp becomes visible when vehicle is engaged in reverse gear.

6. The hidden retractable back-lamp of claim 1 wherein the linear actuator rotates a lamp to become visible when the vehicle is engaged in reverse gear.

7. The hidden retractable back-lamp of claim 1 wherein the linear actuator which rotates a lamp to become hidden when the vehicle is disengaged from reverse gear.

8. The hidden retractable back-lamp of claim 1 further comprising an electronic relay system which controls the linear actuator.

9. The hidden retractable back-lamp of claim 1 wherein a switch is mounted to a transmission of the vehicle to provide power to the relay system.

10. The hidden retractable back-lamp of claim 9 wherein a continuous power supply is provided to the switch mounted on the transmission.

11. The hidden retractable back-lamp of claim 1 wherein a continuous power supply is provided to the relay system.

12. The hidden retractable back-lamp of claim 1 further comprising a means of electrically grounding the relay system and the lamp.

* * * * *